United States Patent [19]

Tanaka et al.

[11] Patent Number: 5,365,158
[45] Date of Patent: Nov. 15, 1994

[54] DRIVING CONTROL APPARATUS FOR INDUCTION MOTOR

[75] Inventors: Shigeru Tanaka, Tokyo; Susumu Tadakuma, Atsugi; Kazuo Shimane, Kamifukuoka, all of Japan

[73] Assignee: Kabushiki Kaisha Toshiba, Kawasaki, Japan

[21] Appl. No.: 982,613

[22] Filed: Nov. 27, 1992

[30] Foreign Application Priority Data

Nov. 30, 1991 [JP] Japan .................. 3-339592
Jan. 28, 1992 [JP] Japan .................. 4-013069

[51] Int. Cl.$^5$ .......................... G06G 7/60; H02P 7/36
[52] U.S. Cl. .................................. 318/806; 318/807; 395/22; 382/15
[58] Field of Search ............... 318/800, 801, 805, 806, 318/807, 808, 803, 810; 395/22; 382/15

[56] References Cited

U.S. PATENT DOCUMENTS

| | | | |
|---|---|---|---|
| 4,780,658 | 10/1988 | Koyama | 318/808 |
| 4,814,683 | 3/1989 | Okamoto et al. | 318/803 |
| 4,967,135 | 10/1990 | Ashikaga et al. | 318/808 |
| 5,003,243 | 3/1991 | Tadakuma et al. | |
| 5,003,490 | 3/1991 | Castelaz et al. | 395/22 |
| 5,136,228 | 8/1992 | Yamada et al. | 318/808 |
| 5,166,593 | 11/1992 | De Doncker et al. | 318/805 |
| 5,196,778 | 3/1993 | Hayashia | 318/807 |

OTHER PUBLICATIONS

Garces: "Parameter Adaption for . . ." in: IEEE Transactions on Industry Applications, vol. J. I-16, issue 2, pp. 173-178.
Weinmann "Maschinenparameter-Einstellung . . ." in: (periodical) Elin-Zeitschrift 1991, issue 3/4, pp. 72-84.
Acarnley, Atkinson: "Induction Motor Parameter Estimation . . ." in: EPE Conference Proceedings, Firenze, 1991, vol. 3, pp. 326-330.
Weidauer, Dittrich: "A new Adaption Method . . ." in: EPE Conference Proceedings, Firenze, 1991, vol. 2, pp. 151-155.

*Primary Examiner*—William M. Shoop, Jr.
*Assistant Examiner*—John W. Cabeca
*Attorney, Agent, or Firm*—Oblon, Spivak, McClelland, Maier & Neustadt

[57] ABSTRACT

A slip frequency type driving control apparatus includes a detector for detecting an input current and an input voltage to an induction motor, a calculating unit for calculating a rotor flux and a torque current of the induction motor, a neural network for outputting an excitation current command value and a slip frequency command value, and a vector control unit for performing vector control for the induction motor. The neural network receives a rotor flux command value, a torque current command value, a calculated rotor flux value, and a calculated torque current value, performs learning on the basis of a back-propagation law using signals output in correspondence with these inputs, and outputs an excitation current command value and a slip frequency command value. The vector control unit detects the torque current and the excitation current on the basis of the output slip frequency command value from the neural network and controls the induction motor in accordance with a deviation between the detected excitation current value and the excitation current command value and a deviation between the detected torque current value and the torque current command value.

12 Claims, 7 Drawing Sheets

DRIVING CONTROL APPARATUS FOR INDUCTION MOTOR

BACKGROUND OF THE INVENTION

1. Field of the Invention

The present invention relates to a slip frequency type vector control apparatus for an induction motor, which uses a neural network capable of automatically meeting changes in rotor resistance or mutual inductance of an induction motor.

2. Description of the Related Art

Conventionally, a vector control system has been often used as a variable speed driving system for an induction motor. The vector control system is designed to handle an induction motor in the same manner as a DC motor. The system separates the rotor side into a torque-axis component and a flux-axis component and controls the individual axial components.

The vector control system is classified into a magnetic field orientation type in which the rotor flux is used as a vector quantity to control the primary current and a slip frequency type in which the flux vector is controlled by arithmetic operations on the basis of induction motor parameters.

Figure 9:
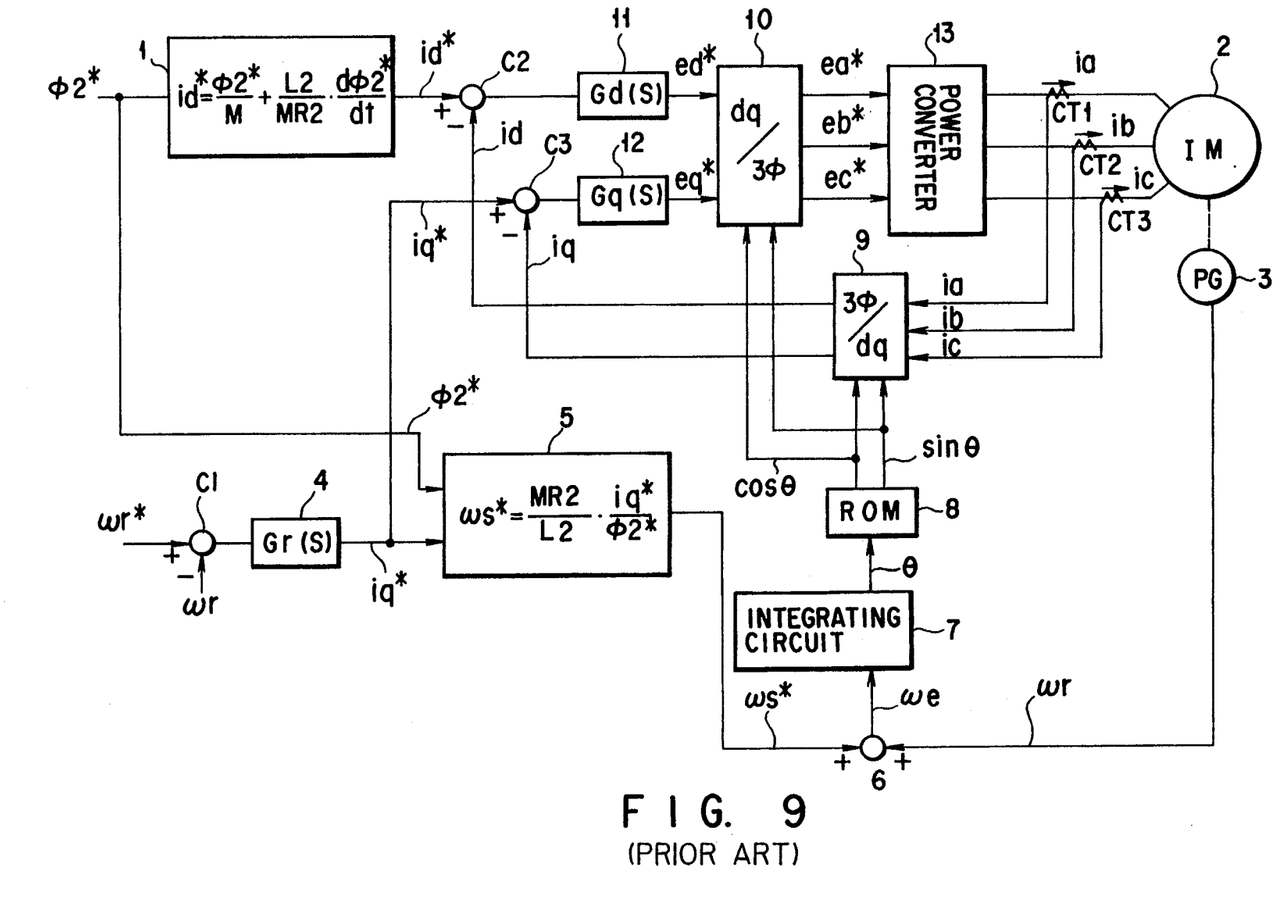
FIG. 9 is a functional block diagram showing a conventionally existing vector control apparatus for an induction motor.

FIG. 9 shows functional blocks of a slip frequency type vector control apparatus, in which reference numeral 2 denotes an induction motor as an object to be controlled.

In this vector control apparatus, an externally output rotor flux command value $\phi 2^*$ is input to an excitation current calculating unit 1 and a slip frequency calculating unit 5, and a speed command value $\omega r^*$, which is similarly externally output, is input to the comparator C1. Three-phase input currents ia, ib, and ic input to the induction motor 2 are detected by current detectors CT1 to CT3, respectively, and a rotational speed $\omega r$ of the induction motor 2 is detected by a rotational speed detector 3.

The excitation current calculating unit 1 calculates an excitation current command value id* from the rotor flux command value $\phi 2^*$ on the basis of equation (1) below and supplies the obtained id* to a comparator C2:

$$id^* = \phi 2^*/M + [L2/(M \cdot R2)] \cdot d\phi 2^*/dt \quad (1)$$

where M is the mutual inductance of the induction motor 2, L2 is the rotor inductance of the induction motor 2, and R2 is the rotor resistance of the induction motor 2.

The comparator C1 calculates the deviation between the speed command value $\omega r^*$ and the rotational speed $\omega r$ and supplies the obtained deviation to a control compensating circuit 4. The control compensating circuit 4 amplifies the deviation and supplies the result as a torque current command value iq* to a slip frequency calculating unit 5 and a comparator C3.

The slip frequency calculating unit 5 calculates a slip frequency command value $\omega s^*$ from the torque current command value iq* on the basis of equation (2) below and supplies the obtained $\omega s^*$ to an adder 6:

$$\omega s^* = (M \cdot R2/L2) \cdot iq^*/\phi 2^* \quad (2)$$

The adder 6 adds the slip frequency command value $\omega s^*$ and the rotational speed $\omega r$ detected by the rotational speed detector 3 to obtain a primary angular frequency $\omega e$ and supplies the obtained primary angular frequency $\omega e$ to an integrating circuit 7. The integrating circuit 7 calculates a phase angle $\theta$ by integrating the primary angular frequency $\omega e$ and supplies the phase angle $\theta$ to a ROM 8.

The ROM 8, which constitutes a memory table, generates two-phase unit sinusoidal signals $\sin\theta$ and $\cos\theta$ in response to the input phase angle $\theta$ and supplies these unit sinusoidal signals $\sin\theta$ and $\cos\theta$ to coordinate transforming circuits 9 and 10.

The coordinate transforming circuit 9 transforms the three-phase currents ia, ib, and ic detected by the current detectors CT1, CT2, and CT3, respectively, into an excitation current (direct-axis current) id and a torque current (quadrature-axis current) iq of a dq coordinate system (rotating coordinate system) on the basis of equations (3) and (4) below:

$$id = \cos\theta \cdot i\alpha - \sin\theta \cdot i\beta \quad (3)$$

$$iq = \sin\theta \cdot i\alpha + \cos\theta \cdot i\beta \quad (4)$$

where $$i\alpha = k \cdot (ia - ib/2 - ic/2)$$

$$i\beta = k' \cdot (ib - ic)$$

$$k = \sqrt{2/3}, \quad k' = 1/\sqrt{2}$$

The comparator C2, on the other hand, compares the excitation current command value id* with the detected excitation current value id to obtain a deviation $\epsilon d = id^* - id$. A control compensating circuit 11 amplifies the deviation $\epsilon d = id^* - id$ and supplies an amplified output ed* to the coordinate transforming circuit 10. The output ed* serves as the d-axis component of a voltage command value. Similarly, the comparator C3 compares the torque current command value iq* with the torque current iq as the quadrature-axis component to obtain a deviation $\epsilon q = iq^* - iq$. A control compensating circuit 12 amplifies the deviation $\epsilon q = iq^* - iq$ and supplies the amplified output eq* to the coordinate transforming circuit 10. This output eq* serves as the q-axis component of the voltage command value.

The coordinate transforming circuit 10 transforms the voltage command values ed* and eq* of the d and q axes into three-phase voltage command values ea*, eb*, and ec* on the basis of equations (5) and (6) below:

$$ea^* = k \cdot e\alpha^* \quad (5)$$

$$eb^* = k \cdot (-e\alpha^*/2 + e\beta^* \cdot \sqrt{3}/2) \quad (6)$$

$$ec^* = k \cdot (-e\alpha^*/2 - e\beta^* \cdot \sqrt{3}/2) \quad (7)$$

where $e\alpha^* = \cos\theta \cdot ed^* + \sin\theta \cdot eq^*$ $e\beta^* = -\sin\theta \cdot ed^* + \cos\theta \cdot eq^*$ A power converter 13 for outputting three-phase AC power having a variable voltage and a variable frequency to the induction motor 2 is constituted by, e.g., a pulse width modulation control (PWM) inverter or a cycloconverter. The power converter 13 generates voltages proportional to the three-phase voltage command values ea*, eb* and ec* input from the coordinate transforming circuit 10 and controls armature currents ia, ib, and ic of the induction motor 2.

The conventional slip frequency type vector control apparatus for an induction motor having the above arrangement performs control such that the detected excitation current value id and the detected torque current value iq coincide with their respective command values, thereby achieving characteristics equivalent to those of a DC motor.

The above conventional vector control apparatus, however, has a drawback in that the operation accuracies of the excitation current calculating unit 1 and the slip frequency calculating unit 5 are decreased if errors are included in the constants (M, R2, and L2), and this degrades the output characteristics of the induction motor.

The constants (M, R2, and L2) of the induction motor 2 change in accordance with the type or rated output of the induction motor, so it is difficult to confirm their correct values. Although arithmetic operations are normally performed using design values, whether the design values of the constants correctly coincide with their actual values is not confirmed. Therefore, it is doubtful whether accurate vector control is realized.

The actual circumstances are that a skilled engineer performs a test operation and adjusts the constants (M, R2, and L2) to values supposed to be optimal while measuring the stationary characteristics. This adjustment is time- and cost-consuming and can be performed only roughly for a general-purpose motor having a large number of induction motors. This poses problems such as degradation in output characteristics of the motor.

The rotor resistance R2 of the induction motor changes in accordance with the temperature change in the rotor, and the mutual inductance M or the rotor inductance L2 of the induction motor changes in accordance with saturation of the core. Therefore, even if correct values are initially set, there is a possibility that the angle between the vectors of the magnetic flux $\phi 2$ and the torque current iq is not maintained at a right angle any longer due to changes in constants during the operation, thereby decreasing the generated torque of the induction motor.

SUMMARY OF THE INVENTION

It is an object of the present invention to provide a driving control apparatus for an induction motor, which makes unnecessary the adjustment of arithmetic constants used in calculating an excitation current command value and a slip frequency command value, and even if the arithmetic constants change during the operation, can automatically adjust the arithmetic constants so as to follow the changes.

A driving control apparatus of the present invention comprises:

a parameter detector for detecting an input current and an input voltage to an induction motor as control parameters of the induction motor;

a calculating unit for calculating a rotor flux and a torque current of the induction motor on the basis of the control parameters;

a neural network for receiving a rotor flux command value and a torque current command value for the induction motor and rotor flux and torque current values calculated by the calculating unit, or the rotor flux command value, the torque current command value, the calculated rotor flux value, the calculated torque current value, and a detected torque current value, performing learning on the basis of a back-propagation law using signals output in correspondence with the inputs, and outputting an excitation current command value and a slip frequency command value; and a vector control unit for detecting an actual excitation current and an actual torque current of the induction motor on the basis of the slip frequency command value output from the neural network and the control parameters, and controlling the induction motor in accordance with a deviation between a detected actual excitation current value and the excitation current command value and a deviation between a detected actual torque current value and the torque current command value.

According to the present invention, the vector control for the induction motor is performed by using the learning function of the neural network. This makes unnecessary the adjustment of the motor constants used in the vector control. In addition, even if the motor constants change during the operation, the apparatus can automatically adjust the motor constants so as to follow the changes.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

An embodiment of the present invention will be described below with reference to the accompanying drawings.

Figure 1:
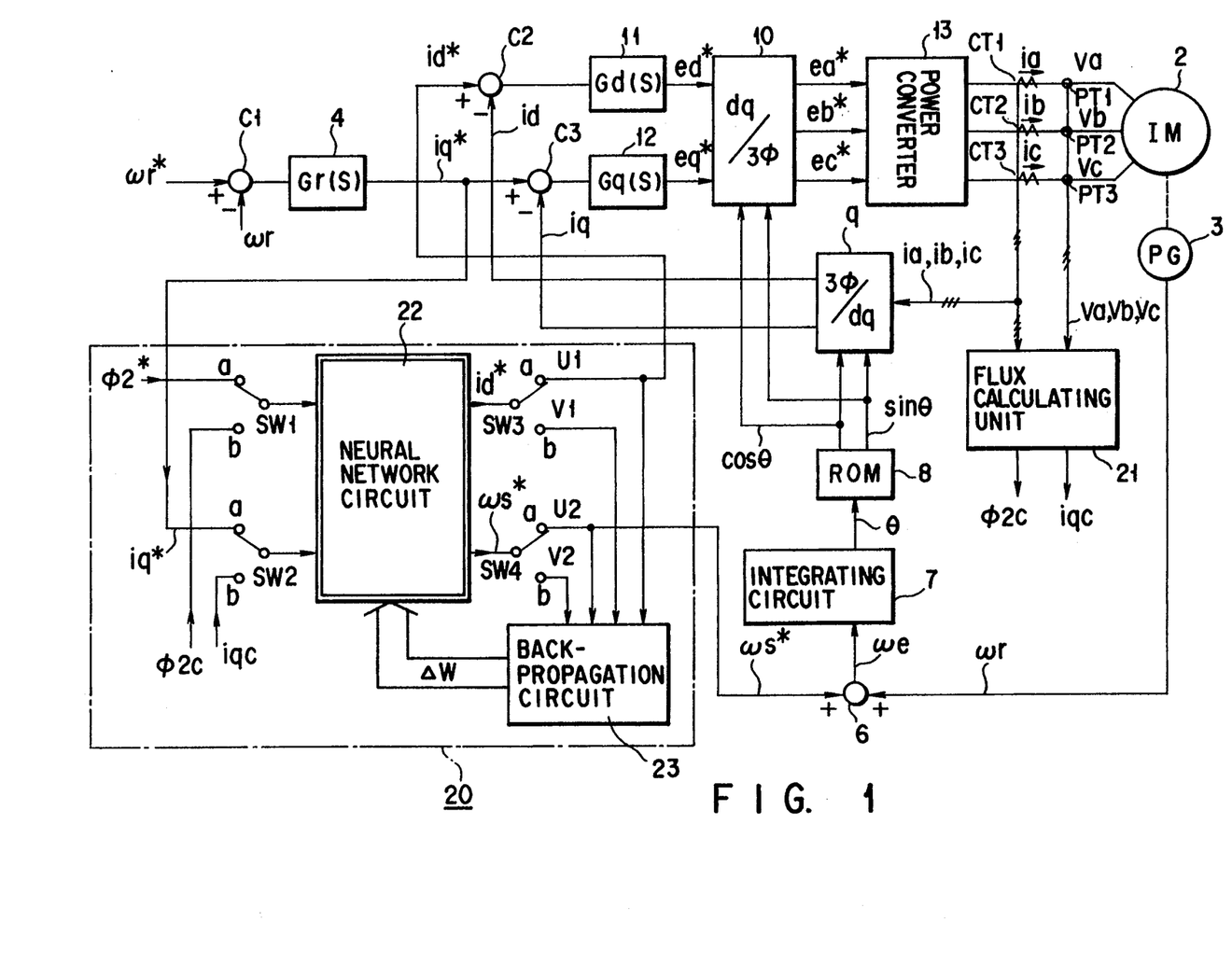
FIG. 1 is a functional block diagram showing a vector driving control apparatus according to an embodiment of the present invention.

FIG. 1 shows functional blocks of a slip frequency type vector control apparatus according to an embodiment of the present invention, in which the same reference numerals as in FIG. 9 denote the same parts.

The vector control apparatus of this embodiment comprises current detectors CT1 to CT3 for detecting three-phase input currents input to an induction motor 2, voltage detectors PT1 to PT3 for detecting three-phase input voltages input to the induction motor 2, a neural network processing unit 20 for obtaining an excitation current command value id* and a slip frequency command value ωs*, a flux calculating unit 21 for calculating the rotor flux and the torque current of the induction motor 2, and a vector control unit for controlling driving of the induction motor.

The vector control unit is constituted by comparators C1 to C3, control compensating circuits 4, 11, and 12, an adder 6, an integrating circuit 7, a ROM 8, coordinate transforming circuits 9 and 10, and a power converter 13. These constituting elements have the same functions as the corresponding constituting elements of the vector control apparatus shown in FIG. 9 and are connected in the same manner as the corresponding parts of the vector control apparatus shown in FIG. 9.

Figure 2:
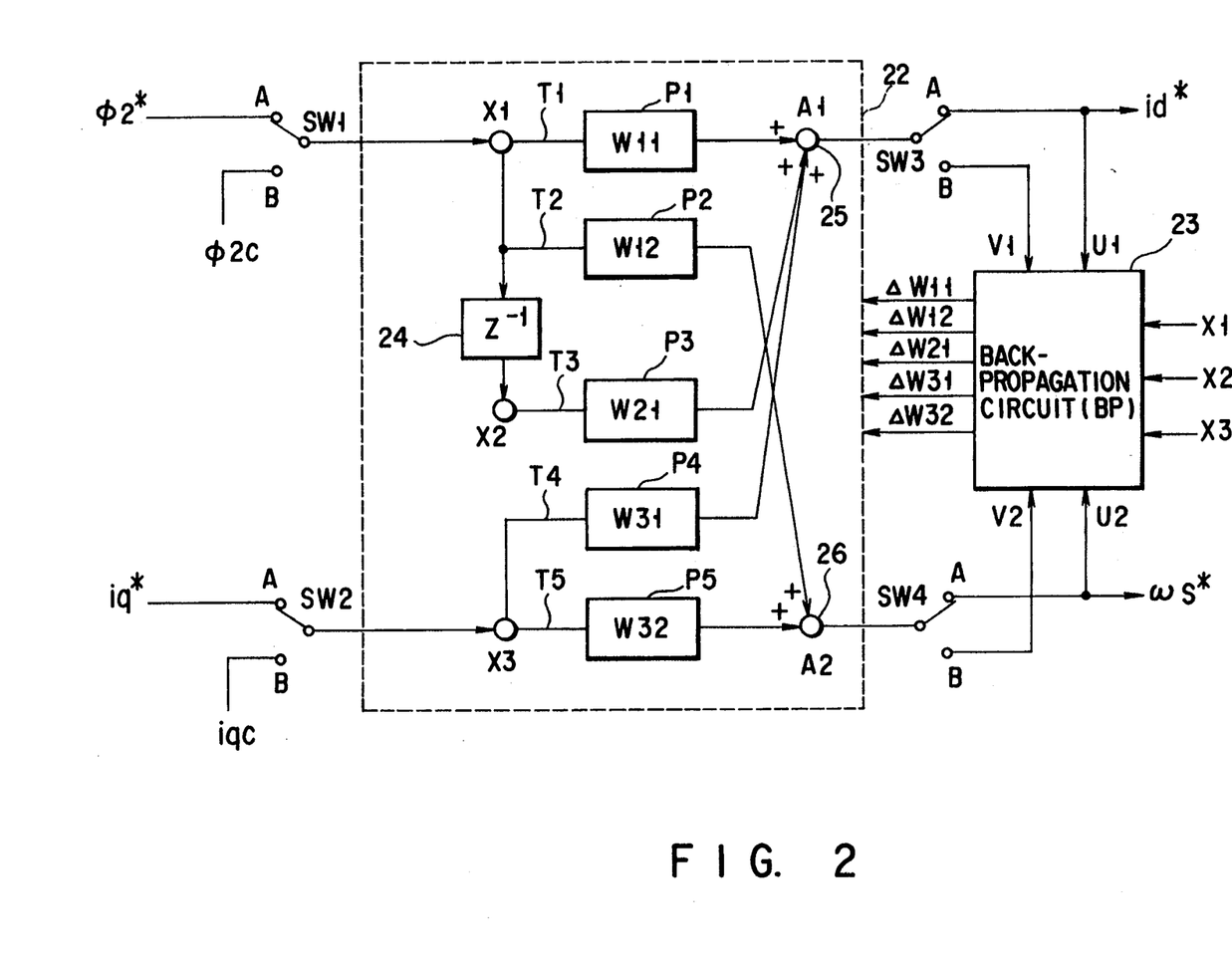
FIG. 2 is a block diagram showing in detail a neural network section incorporated in the apparatus shown in FIG. 1.

FIG. 2 shows the details of the neural network processing unit 20. The neural network processing unit 20 equivalently performs the functions of the excitation current calculating unit 1 and the slip frequency calculating unit 5 of the apparatus shown in FIG. 9.

The neural network processing unit 20 has a neural network circuit 22, input switches SW1 and SW2, output switches SW3 and SW4, and a back-propagation circuit 23.

The input switch SW1 selectively supplies an externally output rotor flux command value φ2* and an input rotor flux value φ2c calculated by the flux calculating unit 21 to the neural network circuit 22. The input switch SW2 selectively supplies an input torque current command value iq* from the control compensating circuit 4 and an input torque current value iqc calculated by the flux calculating unit 21 to the neural network circuit 22.

The neural network circuit 22 is constituted by first to fifth information transmission paths T1 to T5, a delay element 24 for supplying an input signal from the switch SW1 to the third information transmission path T3 with a predetermined delay, a first adder 25, and a second adder 26.

The first information transmission path T1 is provided with a coefficient unit P1 for multiplying an input signal X1 by a weight W11. Similarly, the second to fifth information transmission paths T2 to T5 are provided with coefficient units P2 to P5 for multiplying input signals X2 and X3 by weights W12, W21, W31, and W32, respectively.

The first adder 25 adds the outputs from the first, third, and fourth information transmission paths T1, T3, and T4, and the second adder 26 adds the outputs from the second and fifth information transmission paths T2 and T5.

The back-propagation circuit 23 selectively receives the output from the first adder 25 through the output switch SW3 and the output from the second adder 26 through the output switch SW4.

The switches SW1 to SW4 are closed to a side "A" at the first timing and to a side "B" at the second timing. When the switches are closed to the side "A", the back-propagation circuit 23 stores the input signal from the first adder 25 as U1 and the input signal from the second adder 26 as U2. When the switches are closed to the side "B", the back-propagation circuit 23 stores the input signal from the first adder 25 as V1 and the input signal from the second adder 26 as V2. The back-propagation circuit 23 generates weight correction values ΔW11, ΔW12, ΔW21, ΔW31, and ΔW32 from the differences between (U1,U2) and (V1,V2), thereby correcting the weights of the neural network circuit.

Note that when the output switches SW3 and SW4 are closed to the side "A", the output from the first adder 25 is also input as the excitation current command value id* to the comparator C2 in addition to the back-propagation circuit, and the output from the second adder 26 is also input as the slip frequency command value ωs* to the adder 6 of the vector control unit in addition to the back-propagation circuit.

This embodiment having the above arrangement uses the rotor flux command value φ2* and the torque current command value iq* as the input signals to the neural network circuit 22. Although the rotor flux command value φ2* is normally input as a predetermined value, it is changed when weak field control is to be performed in accordance with the rotational speed of the induction motor 2. The rotor flux command value φ2* is input to the neural network circuit 22 through the switch SW1.

The output from a speed control circuit constituted by the comparator C1 and the control compensating circuit 4 is generally used as the torque current command value iq*. That is, the comparator C1 compares a speed ωr detected by a rotational speed detector 3 with a speed command value ωr* and obtains a deviation ωr=ωr*−ωr. The control compensating circuit 4 amplifies the deviation εr=ωr*−ωr and supplies the result as the torque current command value iq* to the neural network 22 through the switch SW2.

Currents ia, ib, and ic and voltages va, vb, and vc output from the power converter 13 to the induction motor 2 are detected by the current detectors CT1 to CT3 and the voltage detectors PT1 to PT3, respectively. The detected values are input to the flux calculating unit 21. The flux calculating unit 21 calculates the rotor flUX φ2c and the torque current iqc of the induction motor 2 by using the currents ia to ic.

The flux calculating unit 21 coordinate-transforms the detected voltages and currents having three phases (a, b, and c phases) into voltages and currents having two phases (α and β phases) on the basis of equations (8) to (11) below:

$$i\alpha = k \cdot (ia - ib/2 - ic/2) \tag{8}$$

$$i\beta = k' \cdot (ib - ic) \tag{9}$$

and $$e\alpha = k \cdot (ea - eb/2 - ec/2) \tag{10}$$

$$e\beta = k' \cdot (eb - ec) \tag{11}$$

where $$k = \sqrt{2/3}, \quad k' = 1/\sqrt{2}$$

The rotor fluxes φ2α and φ2β of this αβ coordinate system can be obtained by performing arithmetic operations given by equations (12) and (13) below:

$$\phi 2\alpha = (L2/M) \int (e\alpha - R1 \cdot i\alpha) dt - \sigma \cdot L1 \cdot (L2/M) \cdot i\alpha \tag{12}$$

$$\phi 2\beta = (L2/M) \int (e\beta - R1 \cdot i\beta) dt - \sigma \cdot L1 \cdot (L2/M) \cdot i\beta \tag{13}$$

where R1 is the primary resistance, R2 is the rotor resistance, L1 is the primary inductance, L2 is the rotor inductance, M is the mutual inductance, and $\sigma = 1 - M^2/(L1 \cdot L2)$ is the leakage coefficient.

To transform the rotor fluxes $\phi 2\alpha$ and $\phi 2\beta$ of the $\alpha\beta$ coordinate system into those of a dq coordinate system, calculations given by the following equations are performed:

$$\phi 2d = \cos\psi \cdot \phi 2\alpha + \sin\psi \cdot \phi 2\beta \tag{14}$$

$$\phi 2q = -\sin\psi \cdot \phi 2\alpha + \cos\psi \cdot \phi 2\beta \tag{15}$$

$$\cos\psi = \phi 2\alpha / \sqrt{(\phi 2\alpha^2 + \phi 2\beta^2)} \tag{16}$$

$$\sin\psi = \phi 2\beta / \sqrt{(\phi 2\alpha^2 + \phi 2\beta^2)} \tag{17}$$

$$\phi 2d = \sqrt{(\phi 2\alpha^2 + \phi 2\beta^2)} \tag{18}$$

$$\phi 2q = 0 \tag{19}$$

where $\phi 2d$ is the calculated value $\phi 2c$ of the rotor flux.

Current values idc and iqc of the dq coordinate system are calculated from equations (20) and (21) below by using $\cos\psi$ and $\sin\psi$ described above:

$$idc = \cos\psi \cdot i\alpha + \sin\psi \cdot i\beta \tag{20}$$

$$iqc = -\sin\psi \cdot i\alpha + \cos\psi \cdot i\beta \tag{21}$$

where iqc is the calculated torque current value.

Note that the flux calculating unit 21 can be constituted by either hardware or software. The flux calculating unit 21 having the function of obtaining the calculated rotor flux value $\phi 2c$ and the calculated torque current value iqc in accordance with equations (8) to (21) above can be realized by those skilled in the art.

The calculated rotor flux value $\phi 2c$ and the calculated torque current value iqc are input to the other input of the neural network circuit 22.

The neural network processing unit 20 performs the following learning operation in order to obtain an optimal excitation current command value and an optimal slip frequency command value.

The switches SW1 to SW4 are alternately closed to the sides "A" and "B" for each sample time $\Delta t$. The back-propagation circuit 23 causes learning for the weights W of the information transmission paths T1 to T5 of the neural network circuit 22 by using the input signals U1 and U2 from the output switches SW3 and SW4 when the switches are closed to the side "A" and the input signals V1 and V2 therefrom when the switches are closed to the side "B".

This learning operation will be described in more detail below.

At the first timing, the switches SW1 to SW4 are closed to the side "A" to apply appropriate weights W11 to W32 to the neural network circuit 22. The rotor flux command value $\phi 2^*$ and the torque current command value iq* are input to the neural network circuit 22 to cause the circuit to output the excitation current command value id* and the slip angular frequency command value $\omega S^*$.

In the neural network circuit 22, the first and second adders 25 and 26 output the excitation current command value id* and the slip angular frequency command value $\omega s^*$ given by equations (22) and (23) below:

$$id^* = X1 \cdot W11 + X2 \cdot W21 + X3 \cdot W31 \tag{22}$$

$$\omega s^* = X1 \cdot W12 + X3 \cdot W32 \tag{23}$$

The excitation current command value id* and the slip frequency command value $\omega s^*$ output from the neural network circuit 22 are input to the vector control unit described above, thereby performing vector control for the induction motor 2. Note that the operation of the vector control unit has already been described in detail above, so a description thereof will be omitted.

The voltages va, vb, and vc and the currents ia, ib, and ic obtained when the operation is performed in this condition are input to the flux calculating unit 21, thereby calculating the rotor flux $\phi 2c$ and the torque current iqc of the induction motor 2 in accordance with the method described above. The back-propagation circuit 23 stores the above id* and $\omega s^*$ as U1 and U2, respectively.

At the second timing, the switches SW1 to SW4 are closed to the side "B" to input the calculated rotor flux value $\phi 2c$ and the calculated torque current value iqc to the neural network circuit 22. The neural network circuit 22 calculates an excitation current command value id*' and a slip frequency command value $\omega s^{*\prime}$ on the basis of the calculated rotor flux value $\phi 2c$ and the calculated torque current value iqc. The back-propagation circuit 23 stores these id*' and $\omega s^{*\prime}$ as V1 and V2, respectively.

The back-propagation circuit 23 changes the weights of the neural network in accordance with the differences between the current command values id*' and $\omega s^{*\prime}$ and the previously calculated command values id* and $\omega s^*$, respectively, thereby repeatedly executing the learning until the differences finally become zero.

That is, assuming that differences $\delta 1$ and $\delta 2$ are given by:

$\delta 1 = U1 - V1 = id^* - id^{*\prime}$
$\delta 2 = U2 - V2 = \omega s^* - \omega s^{*\prime}$ the back-propagation circuit 23 calculates correction amounts $\Delta W11$ to $\Delta W32$ of the weights W11, W12, W21, W31, and W32 as follows:

$\Delta W11 = K1 \cdot \delta 1 \cdot X1$
$\Delta W12 = K2 \cdot \delta 2 \cdot X1$
$\Delta W21 = K1 \cdot \delta 1 \cdot X2$
$\Delta W31 = K1 \cdot \delta 1 \cdot X3$
$\Delta W32 = K2 \cdot \delta 2 \cdot X3$ where
K1 and K2 are the gains
X1 = $\phi 2c(n)$: $\phi 2c$ at sampling
X2 = $\phi 2c(n-1)$: $\phi 2c$ at immediately preceding sampling
X3 = iqc(n): iqc at sampling Note that the back-propagation circuit 23 having the function of calculating the correction amounts $\Delta W$ as described above can be constituted by either hardware or software and easily realized from the above equations by those skilled in the art. The switches SW1 to SW4 can also be constituted by either hardware or software.

The weights W11 to W32 of the information transmission paths P1 to P5 in the neural network circuit 22 are corrected as follows:

$W11(k+1) = W11(k) + \Delta W11$
$W12(k+1) = W12(k) + \Delta W12$
$W21(k+1) = W21(k) + \Delta W21$
$W31(k+1) = W31(k) + \Delta W31$ $$W32(k+1) = W32(k) + \Delta W32$$

If, for example, δ1 becomes positive for id*>id*', the weights W11, W21, and W31 are increased to increase the excitation current command value id* used in an actual operation. As a result, learning is performed to satisfy id*=id*'.

If δ2 becomes positive for ωs*>ωs*', the coupling coefficients W12 and W32 are increased to increase the slip frequency ωs* used in an actual operation. As a result, learning is performed to satisfy ωs*=ωs*'.

Finally, $\phi2^* = \phi2c$, iq*=iqc, id*=id*', and ωs*=ωs*' are satisfied to settle the operation. In this case, if the rotor flux value $\phi2c$ and the torque current value iqc which are calculated by the flux calculating unit 21 are satisfactorily accurate values, the excitation current command value id* and the slip angular frequency command value ωs* calculated by the neural network can also be expected to be satisfactorily accurate values. This makes it possible to achieve a vector-controlled induction motor having output characteristics equivalent to those of a DC motor.

In general, the accuracies of the calculated rotor flux value $\phi2c$ and the calculated torque current value iqc obtained by the flux calculating unit 21 are degraded when the rotational speed of the induction motor 2 is low. Therefore, the learning of the neural network described above is performed when the rotational speed is high and temporarily stopped when it is low.

According to this embodiment, even if the rotor resistance R2 changes due to the temperature rise of the rotor during the operation, the weights of the neural network are updated in correspondence with the change. Therefore, vector control for the induction motor 2 can be performed constantly in an optimal condition. This similarly applies to a case wherein the mutual inductance changes because the core of the induction motor 2 is saturated.

For this reason, the driving control apparatus for an induction motor according to the present invention can automatically select optimal values for the constants used in vector control without requiring skilled engineers and is highly resistant against disturbances such as a temperature rise.

According to this embodiment, therefore, it is possible to make unmanned adjustment and at the same time to realize robustness which makes feasible optimal vector control even if the constants R2 and M change.

Note that the above embodiment comprises the five information transmission paths (weights) and the one delay element. However, to obtain a better response, it is possible to increase the number of delay elements or to increase or decrease the number of information transmission paths having their respective weights.

In addition, although the flux calculating unit 21 is used to detect the rotor flux $\phi2c$ and the torque current iqc in the embodiment shown in FIG. 1, the apparatus can be similarly achieved by using a flux observer.

Modifications of the neural network processing unit according to the above embodiment will be described below. The first to fourth modifications to be described below are used in place of the neural network processing unit 20 shown in FIG. 1.

Figure 3:
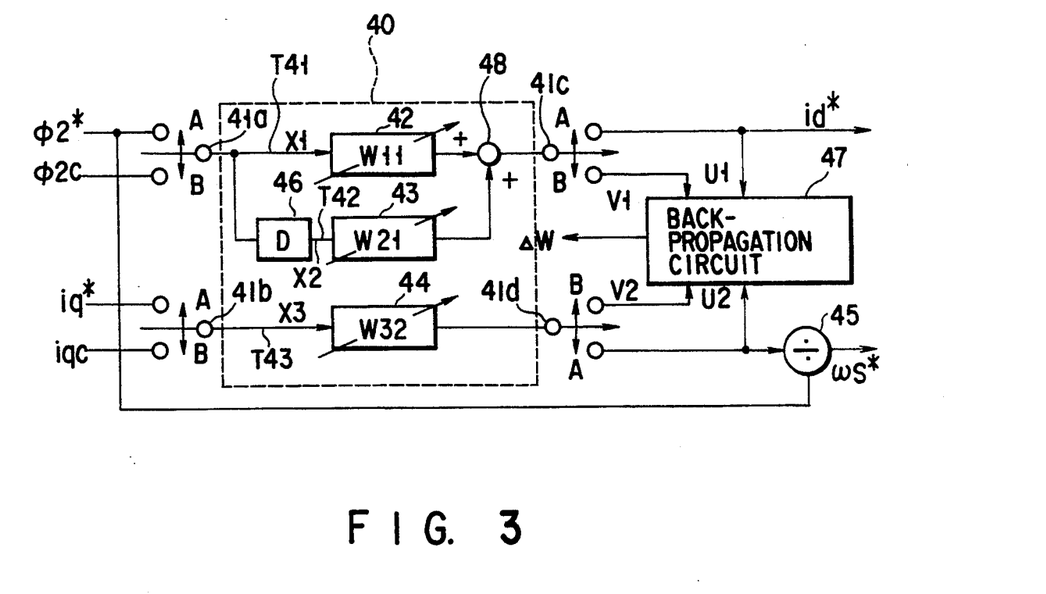
FIG. 3 is a block diagram showing the first modification of a neural network applicable to the apparatus shown in FIG. 1.

FIG. 3 shows the first modification of the neural network processing unit.

This modification comprises a neural network 40, input switches 41a and 41b, output switches 41c and 41d, a divider 45, and a back-propagation circuit 47.

The input switch 41a selectively supplies the rotor flux command value $\phi2^*$ and the rotor flux value $\phi2c$ calculated by the flux calculating unit 21 to the neural network circuit 40, and the switch 41b selectively supplies the torque current command value iq* from the control compensating circuit 4 and the torque current value iqc calculated by the flux calculating unit 21 to the neural network circuit 40.

The neural network circuit 40 is constituted by first to third information transmission paths T41 to T43, a differential unit or differentiator 46 for differentiating the input signal from the switch 41a and supplies the signal to the second information transmission path T42, and an adder 48 for receiving the outputs from the first and second information transmission paths.

The first information transmission path T41 is provided with a function generator 42 for generating a first excitation current weight function W11, and the second information transmission path T42 is provided with a function generator 43 for generating a second excitation current weight function W21. The third information transmission path T43 is provided with a function generator 44 for generating a slip frequency weight function W32.

The output from the adder 48 is extracted through the output switch 41c and input to the back-propagation circuit 47 and the comparator C2 shown in FIG. 1. The output from the third information transmission path is extracted through the output switch 41d and input to the back-propagation circuit 47 and the divider 45.

The back-propagation circuit 47 receives signals input as U1 and U2 when the output switches 41c and 41d are closed to the side "A" and those input as V1 and V2 when they are closed to the side "B".

The divider 45 receives the output from the third information transmission path when the rotor flux command value $\phi2^*$ is input and the output switch 41d is closed to the side "A". The divider 45 outputs the quotient as the slip frequency command value ωs*.

When the output switches 41c and 41d are closed to the side "A", the output from the adder 48 is input to the back-propagation circuit 47 and at the same time to the comparator C2 shown in FIG. 1 as the excitation current command value id*.

The modification having the above arrangement performs control as follows.

That is, at the first timing, the switches 41a to 41d are closed to the side "A" to supply signals X1 to X3 to the information transmission paths. The first information transmission path supplies the product of X1 and the weight function W11 to the adder 48, and the second information transmission path supplies the product of X2, which is the differentiated value of X1, and the weight function W21 to the adder 48. The output from the adder 48 is output as the excitation current command value id* and at the same time input as U1 to the back-propagation circuit 47. The product of X3 and the weight function w32 is input to the divider 45 and also input as U2 to the back-propagation circuit 47.

The induction motor 2 is controlled by using the excitation current command value id* and the slip frequency command value ωs* output from the neural network circuit 40 at this first timing.

At the second timing, the switches 41a to 41d are closed to the side "B" to set calculated values from the flux calculating unit 21 as X1, X2, and X3, thereby calculating V1 and V2 in the same manner as the command values. Learning is performed for W11, W21, and W32 by using the following equations. An evaluation function J is set as represented by equation (24) below:

$$J = \tfrac{1}{2} \times \{(V1-U1)^2 + (V2-U2)^2\} \tag{24}$$

In this case, change amounts ΔW of internal parameters are given by equations (25) and (26) below assuming that learning gains are Kd1 and Kd2:

$$\Delta W11 = (\partial J/\partial W11) \cdot Kd1 = (V1-U1)X1 \cdot Kd1 \tag{25}$$

$$\Delta W32 = (\partial J/\partial W32) \cdot Kd2 = (V2-U2)X2 \cdot Kd2 \tag{26}$$

Learning is performed for the internal parameters as represented by equations (27) to (29) below:

$$W11 = W11 + \Delta W11 \tag{27}$$

$$W32 = W32 + \Delta W32 \tag{28}$$

$$W21 = 1/W32 \tag{29}$$

The excitation current command value id* and the slip frequency command value ωs* are calculated by using the new internal parameters:

$$id^* = (W11 \cdot X1) + (W21 \cdot X2) \tag{30}$$

$$\omega s^* = (W33 \cdot X3)/\phi 2^* \tag{31}$$

Figure 4:
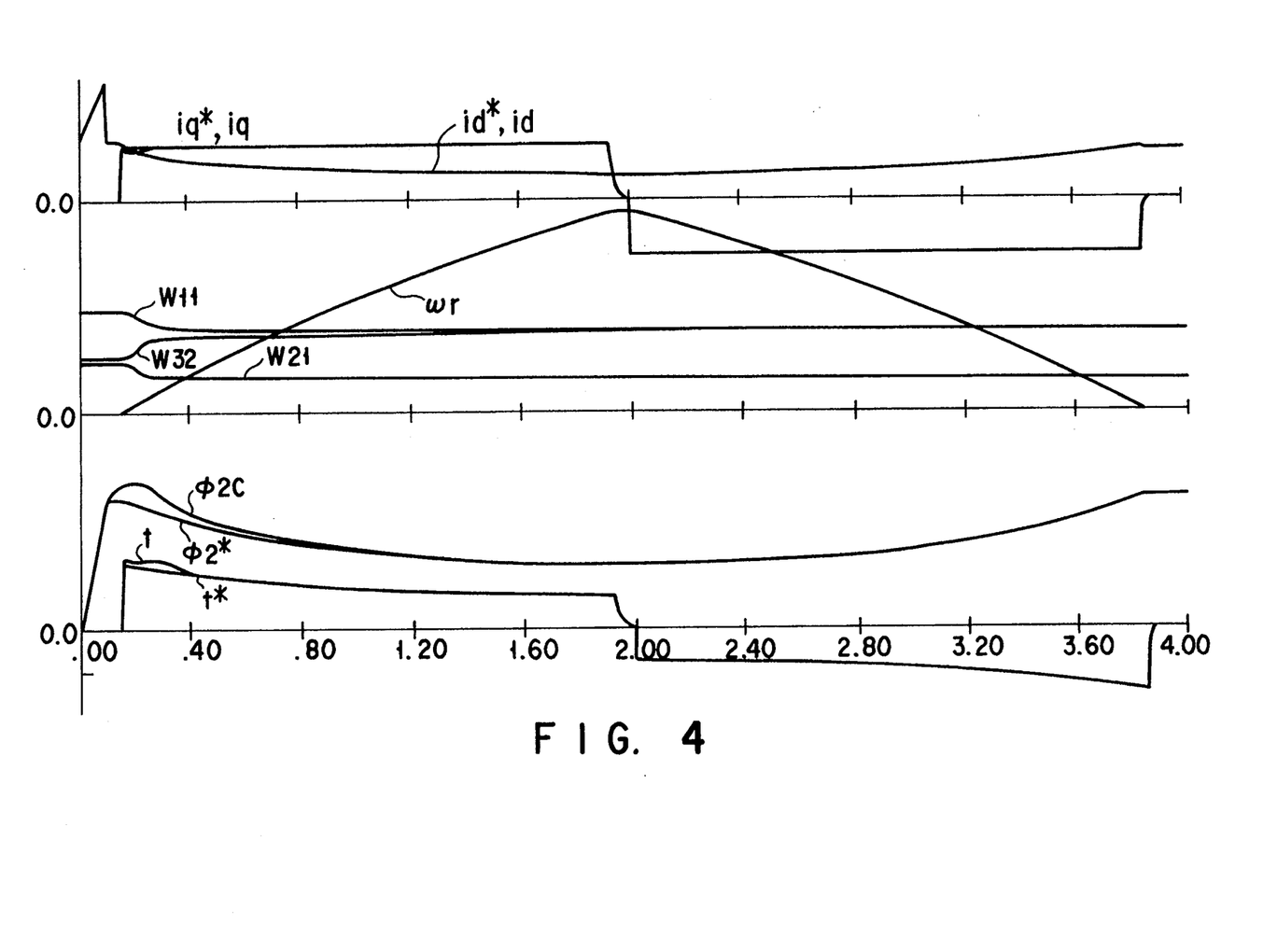
FIG. 4 is a view showing the simulation result of the neural network shown in FIG. 3.

FIG. 4 is a timing chart obtained when the first modification described above is applied to the vector control apparatus shown in FIG. 1 and the operation is simulated. As shown in FIG. 4, according to the first embodiment, learning is performed such that the weight functions W are automatically set at optimal values, and a generated torque r and a rotor flux φ2c of the motor are corrected such that no errors are produced with respect to a command value φ2*.

Note that the back-propagation circuit 47 may perform control as follows.

That is, assume that command values to be input from the switch 41a to the first to third information transmission paths when the switches 41a to 41d are closed to the side "A" at the first timing are X1, X2, and X3, respectively, and that the products of the input signals and the weight functions obtained in the respective information transmission paths are U1 and U2.

In addition, assume that calculated values to be input from the switch 41a to the first to third information transmission paths when the switches 41a to 41d are closed to the side "B" at the second timing are X1, X2, and X3, respectively, and that the products of these input signals and the weight functions are V1, and V2.

The evaluation function J is set as represented by equation (32) below:

$$J = \tfrac{1}{2} \times \{(U1-V1)^2 + (U2-V2)^2\} \tag{32}$$

In this case, the change amounts ΔW of the internal parameters are represented by equations (33) to (35) below assuming that learning gains are Kd1, Kd2, and Kd3:

$$\Delta W11 = (\partial J/\partial W11) \cdot Kd1 = (U1-V1) \cdot X1 \cdot Kd1 \tag{33}$$

$$\Delta W21 = (\partial J/\partial W21) \cdot kd2 = (U2-V2) \cdot X2 \cdot kd2 \tag{34}$$

$$\Delta W32 = (\partial J/\partial W32) \cdot Kd3 = (U2-V2) \cdot X2 \cdot Kd3 \tag{35}$$

Learning is performed for the new internal parameters as represented by equations (36) to (38) below:

$$W11 = W11 + \Delta W11 \tag{36}$$

$$W21 = W21 + \Delta W21 \tag{37}$$

$$W32 = W32 + \Delta W32 \tag{38}$$

The excitation current command value id* and the slip frequency command value ωs* are calculated as follows by using the new internal parameters:

$$id^* = (W11 \cdot X1) + (W21 \cdot X2) \tag{39}$$

$$\omega s^* = (W32 \cdot X3)/\phi 2^* \tag{40}$$

According to this modification, therefore, the use of the divider 45 eliminates mutual interference terms, and this makes it possible to reduce the number of transmission paths. As a result, the learning time can be effectively shortened.

Figure 5:
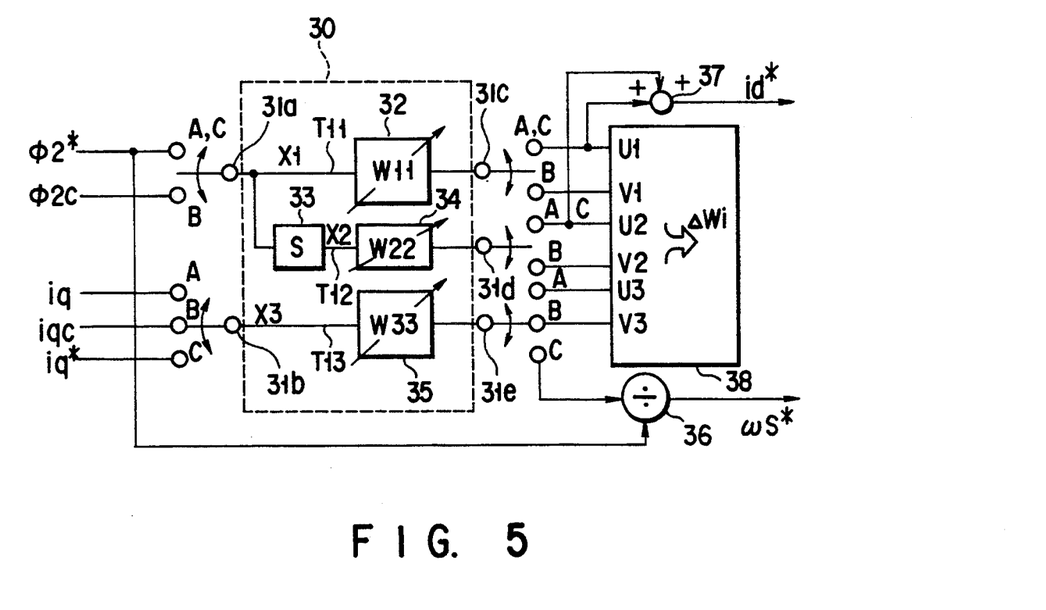
FIG. 5 is a block diagram showing the second modification of the neural network applicable to the apparatus shown in FIG. 1.

A second modification of the neural network processing unit shown in FIG. 5 comprises a linear two-phase neural network circuit 30, input switches 31a and 31b, output switches 31c to 31e, a back-propagation circuit 38, a divider 36, and an adder 37.

The input switch 31a selectively supplies the roter flux command value φ2* and the calculated rotor flux value φ2c from the flux calculating unit 21 to the neural network circuit 30. The switch 31b selectively supplies the torque current command value iq* from the control compensating circuit 4, the calculated torque current value iqc from the flux calculating unit 21, and the detected torque current value iq from the coordinate transforming circuit 9 to the neural network circuit 30.

The neural network circuit 30 is constituted by first to third information transmission paths T11 to T13 and a differential unit or differentiator 33 for differentiating the input signal from the switch SW1 and supplies the signal to the second information transmission path T12.

The first information transmission path T11 is provided with a function generator 32 for multiplying an input signal X1 by a weight W11. Similarly, the second and third information transmission paths T12 and T13 are provided with function generators 34 and 35 for multiplying input signals X2 and X3 by weights W22 and W33, respectively.

The output switch 31c selectively switches the transmission destinations of the output signal from the first information transmission path T11. The switch 31d selectively switches the transmission destinations of the output signal from the second information transmission path T12. The switch 31e selectively switches the transmission destinations of the output signal from the third information transmission path T13.

The divider 36 divides the output signal from the third information transmission path T13 through the switch 31e by the rotor flux command value φ2* and outputs the quotient as the slip frequency command value ωs*. The adder 37 adds the outputs from the first and second information transmission paths T11 and T12 and outputs the sum as the excitation current command value id*.

The back-propagation circuit 38 stores input signals U1, U2, and U3 input from the output switches 31c to 31e at the first timing and stores input signals V1, V2, and V3 input therefrom at the second timing. The back-propagation circuit 38 corrects the weights of the neural network in accordance with the differences between (U1,U2,U3) and (V1,V2,V3).

The learning operation performed by the neural network processing unit having the above arrangement will be described below.

At the first timing, the switches 31a to 31e are closed to the side "A" to supply the rotor flux command value $\phi 2^*$ and the detected torque current value iq to the neural network circuit 30 through the input switches 31a and 31b.

The first to third information transmission paths T11 to T13 multiply these input signals X1 to X3 by their respective weights and output the products. The output switches 31c and 31d supply the outputs from the first and second information transmission paths to the back-propagation circuit 38 as U1 and U2, respectively, and to the adder 37. The switch 31e supplies the output from the third information transmission path to the back-propagation circuit 38 as U3.

That is, the back-propagation circuit 38 stores the product of X1 and the weight W11 as U1, the product of X2, which is the differentiated value of X1, and the weight W22 as U2, and the product of X3 and the weight W33 as U3.

The induction motor 2 is controlled by using the output excitation current command value id* from the adder 37 and the output slip frequency command value $\omega s^*$ from the divider 36. The input current and voltage to the induction motor 2 controlled by the command values generated at the first timing are detected, and the flux calculating unit obtains the calculated rotor flux value $\phi 2c$ and the calculated torque current value iqc in accordance with the method described above. These calculated rotor flux value $\phi 2c$ and the calculated torque current value iqc are input to the input switches 1a and 31b.

At the second timing, the switches 31a to 31e are closed to the side "B" to supply the calculated rotor flux value $\phi 2c$ and the calculated torque current value iqc to the neural network circuit 30. The output signals from the individual paths of the neural network circuit 30 in correspondence with the calculated input values are stored in the back-propagation circuit 38 as V1, V2, and V3 in the same manner as the command values.

The back-propagation circuit 38 corrects the weights of the information transmission paths on the basis of equations (41) to (47) below.

That is, the evaluation function J is set as represented by equation (41) below:

$$J = \tfrac{1}{2} \times \{(V1-U1)^2 + (V2-U2)^2 + (V3-U3)^2\} \tag{41}$$

Assuming that learning gains are Kd1, Kd2, and Kd3, the correction amounts ΔW of the weights are calculated on the basis of equations (42) to (44) below:

$$\Delta W11 = (\partial J/\partial W11)\cdot Kd1 = (V1-U1)\cdot X1\cdot Kd1 \tag{42}$$

$$\Delta W22 = (\partial J/\partial W22)\cdot Kd2 = (V2-U2)\cdot X2\cdot Kd2 \tag{43}$$

$$\Delta W33 = (\partial J/\partial W33)\cdot Kd3 = (V3-U3)\cdot X3\cdot Kd3 \tag{44}$$

The respective weights of the first to third information transmission paths of the neural network circuit 30 are corrected on the basis of equations (45) to (47) below:

$$W11 = W11 + \Delta W11 \tag{45}$$

$$W33 = W33 + \Delta W33 \tag{46}$$

$$W22 = 1/W33 \tag{47}$$

At the third timing, the switches 31a to 31e are closed to the side "C" to supply the rotor flux command value $\phi 2^*$ from the switch 31a and the torque current command value iq* from the switch 31b. The neural network circuit 30 calculates the excitation current command value id* and the slip frequency command value $\omega s^*$ from these inputs by using the new weights W corrected as described above. The neural network 30 outputs id* and $\omega s^*$ given by equations (48) and (49) below:

$$id^* = (W11\cdot X1) + (W22\cdot X2) \tag{48}$$

$$\omega s^* = (W33\cdot X3)/\phi 2^* \tag{49}$$

The signal output from the third information transmission path at the third timing is not used in the learning but divided by the rotor flux command value $\phi 2^*$ by the divider 36, and the quotient is output as the slip frequency command value $\omega s^*$.

According to this modification, therefore, since learning is performed for the weight coefficient W33 by using the actual current iq, erroneous learning caused by a current control error eq=iq*−iq can be advantageously eliminated. This modification also has an advantage in that the learning of the neural network is not adversely affected even if iq* is not equal to iq in a transient state.

Figure 6:
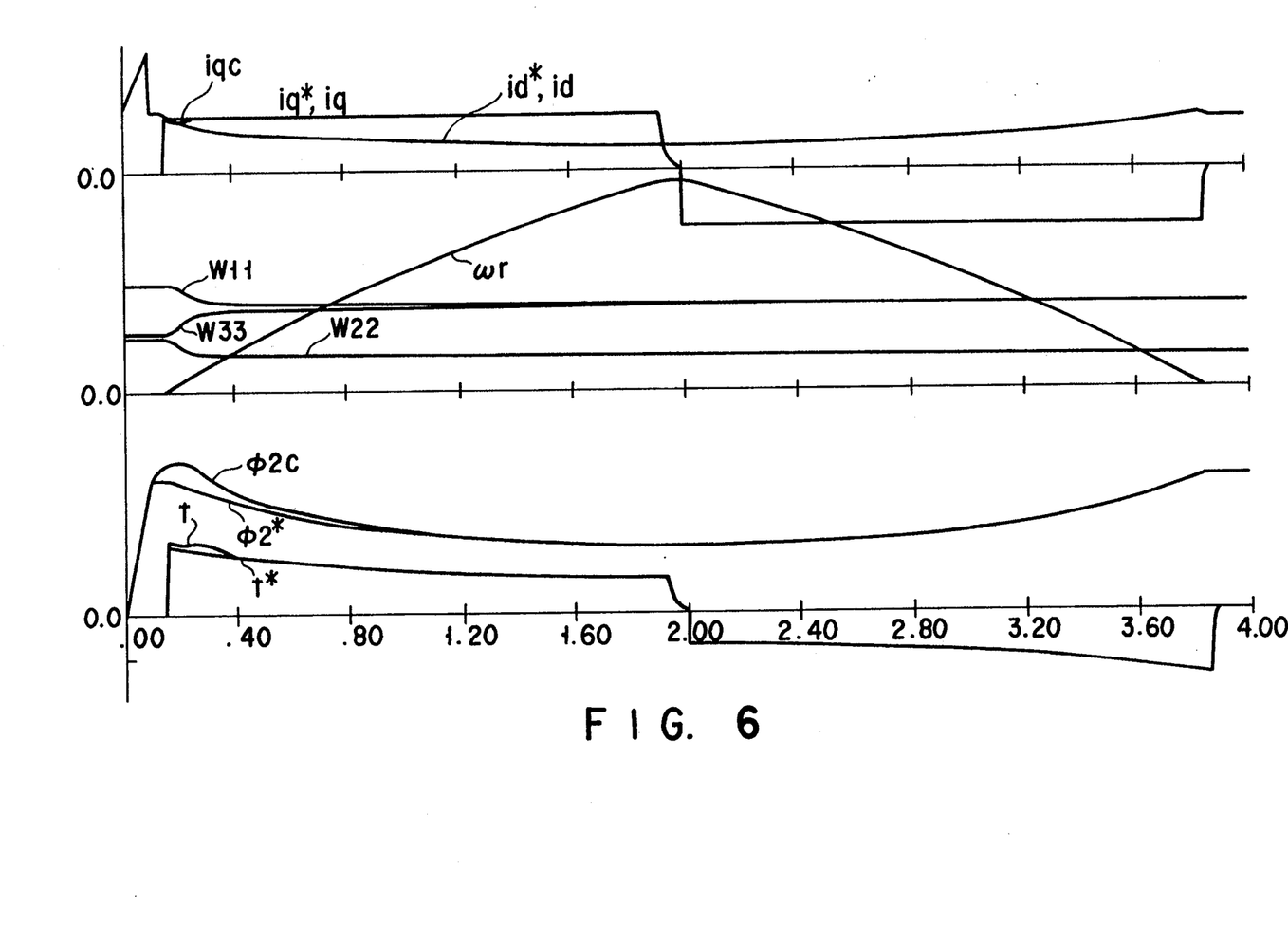
FIG. 6 is a view showing the simulation result of the neural network shown in FIG. 5.

FIG. 6 shows changes in the various command and calculated values and the weights W11, W22, and W33 when driving of the induction motor 2 is controlled by the vector control apparatus using the neural network processing unit according to the above second modification. As shown in FIG. 6, according to this modification, when driving of the induction motor 2 is controlled by using appropriate internal parameters, learning is performed such that the weights w of the neural network are automatically set at optimal values, and a generated torque τ and the calculated rotor flux value $\phi 2c$ of the induction motor 2 are corrected so as not to produce errors with respect to the rotor flux command value $\phi 2^*$.

Figure 7:
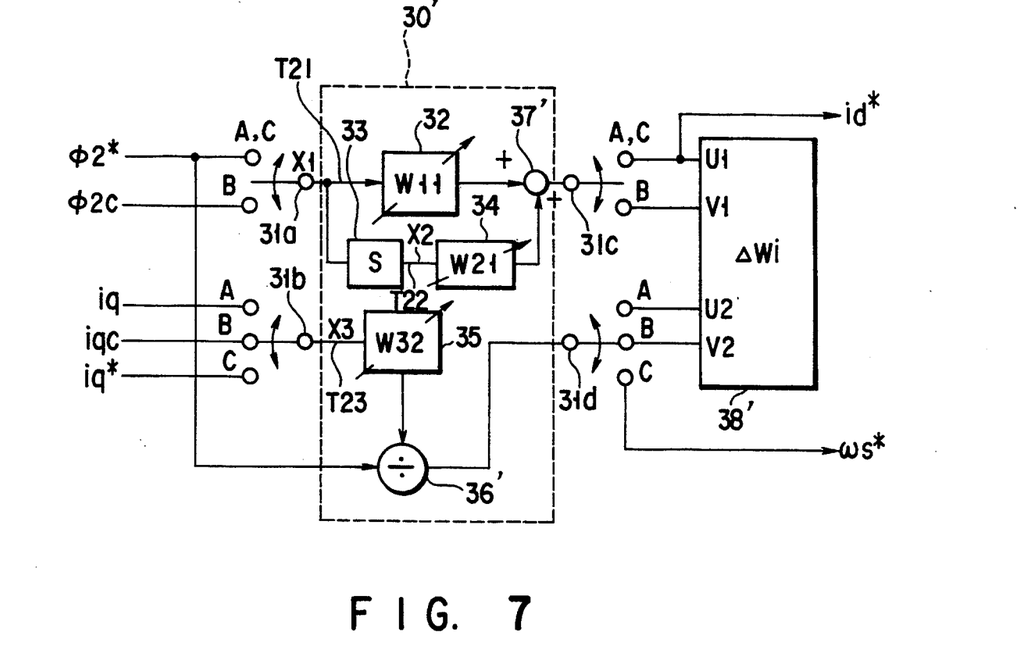
FIG. 7 is a block diagram showing the third modification of the neural network applicable to the apparatus shown in FIG. 1.

FIG. 7 shows the third modification of the neural network processing unit.

The neural network processing unit of this modification comprises a neural network circuit 30', input switches 31a and 31b, output switches 31c and 31d, and a back-propagation circuit 38'. In this modification, the sum of a term proportional to the flux and a term proportional to the change in flux is input to the back-propagation circuit.

Similar to the input switches used in the modification of FIG. 5, the input switches 31a and 31b selectively supply the rotor flux command value $\phi 2^*$, the calculated rotor flux value $\phi 2c$, the detected torque current value iq, the calculated torque current value iqc, and the torque current command value iq* to the neural network circuit 30'.

The neural network circuit 30' is constituted by first to third information transmission paths T21 to T23, a differential unit 33, a divider 36', and an adder 37'. In this modification, the outputs from the first and second information transmission paths T21 and T22 are input to the adder 37', and the output from the third information transmission path T23 is input to the divider 36'.

The divider 36' also receives the rotor flux command value $\phi 2^*$ and supplies its output to the output switch 31d. The output from the adder 37' is input to the output switch 31c.

Similar to the output switches used in the modification shown in FIG. 5, the output switches 31c and 31d apply the outputs from the adder 37' and the divider 36' to the back-propagation circuit 38' as (U1,U2) and (V1,V2) at the first and second timings. The switch 31d supplies the output from the divider 36' to the adder 6 shown in FIG. 1 at the third timing.

Figure 8:
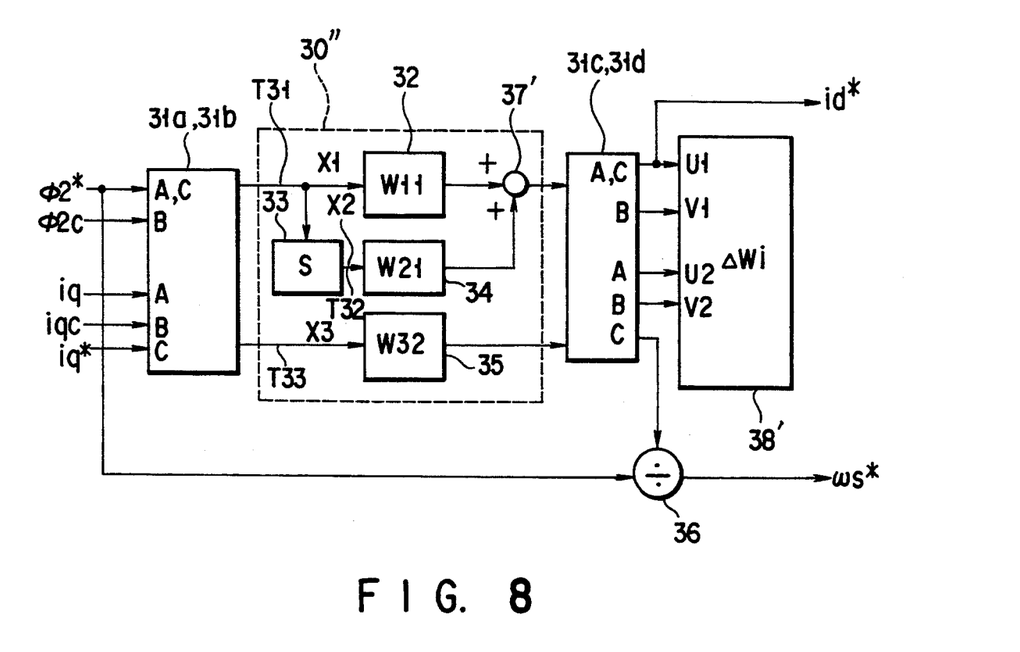
FIG. 8 is a block diagram showing the fourth modification of the neural network applicable to the apparatus shown in FIG. 1.

FIG. 8 shows the fourth modification having an arrangement which is a combination of the arrangements shown in FIGS. 5 and 7.

In a neural network circuit 30" of this modification, an adder 37' adds the outputs from first and second information transmission paths T31 and T32 and supplies the sum to an output switch 31c, and the output from a third information transmission path T33 is input to a divider 36 through an output switch 31d. Other arrangements are the same as those in the modification shown in FIG. 5 or 7.

When the vector control apparatus is constituted by using the neural network processing unit shown in FIG. 7 or 8 having the above arrangement in place of the neural network processing unit 20 shown in FIG. 1, the same effects as the above embodiment can be obtained.

Note that the present invention is not limited to the above embodiment and modifications but can be variously modified and carried out without departing from the spirit and scope of the present invention.

What is claimed is:

1. A driving control apparatus for an induction motor, comprising:

parameter detecting means for detecting control parameters of said induction motor;

calculating means for calculating a rotor flux and a torque current of said induction motor on the basis of the control parameters;

neural network means, having weight functions to provide an excitation current command value and a slip frequency command value, for receiving a rotor flux command value and a torque current command value for said induction motor and rotor flux and torque current values calculated by said calculating means and for processing the received rotor flux command value, the received torque current command value, the received rotor flux value, and the received torque current value in accordance with the weight functions, and outputting an excitation current command value and a slip frequency command value;

back propagation means for processing the excitation current command value and the slip frequency command value input from said neural network means, to obtain a plurality of correction amounts corresponding to the weight functions, and for optimizing the weight functions in accordance with the correction amounts; and vector control means for detecting an actual excitation current and an actual torque current of said induction motor on the basis of the slip frequency command value output from said neural network means and the control parameters, and controlling said induction motor in accordance with a deviation between a detected actual excitation current value and the excitation current command value and a deviation between a detected actual torque current value and the torque current command value.

2. An apparatus according to claim 1, wherein said neural network means comprises a neural network constituted by a plurality of information transmission paths having respective variable weights, switching means for supplying the rotor flux command value, the torque current command value, the calculated rotor flux value, and the calculated torque current value to said information transmission paths and selectively supplying outputs from said information transmission paths to said back-propagation means, and said back-propagation means correct the weights of said information transmission paths to optimal values in accordance with the outputs from said information transmission paths.

3. An apparatus according to claim 2, wherein said neural network includes:

a first information transmission path for multiplying the rotor flux command value and the calculated rotor flux value selectively input from said switching means by a weight W11 and outputting the products;

a second information transmission path for multiplying the rotor flux command value and the calculated rotor flux value selectively input from said switching means by a weight W12 and outputting the products;

a delay element for delaying the rotor flux command value and the calculated rotor flux value selectively input from said switching means;

a third information transmission path for multiplying the outputs from said delay element by a weight W21 and outputting the products;

a fourth information transmission path for multiplying the torque current command value and the calculated torque current value selectively input from said switching means by a weight W31 and outputting the products;

a fifth information transmission path for multiplying the torque current command value and the calculated torque current value selectively input from said switching means by a weight W32 and outputting the products;

a first adding element for adding the outputs from said first, third, and fourth information transmission paths and outputting the sum signal as an excitation current command value; and a second adding element for adding the outputs from said second and fifth information transmission paths and outputting the sum signal as a slip frequency command value, and said switching means supplies the rotor flux command value and the torque current command value to said neural network at the first timing, supplies the calculated rotor flux value and the calculated torque current value to said neural network at the second timing, and supplies the outputs from said first and second adding elements to said back-propagation means at the first and second timings.

4. An apparatus according to claim 3, wherein said back-propagation means calculates correction amounts $\Delta W11$, $\Delta W12$, $\Delta W21$, $\Delta W31$, and $\Delta W32$ of the weights on the basis of the following equations:

$$\Delta W11 = K1 \cdot (U1 - V1) \cdot X1$$

$$\Delta W12 = K2 \cdot (U2-V2) \cdot X1$$

$$\Delta W21 = K1 \cdot (U1-V1) \cdot X2$$

$$\Delta W31 = K1 \cdot (U1-V1) \cdot X3$$

$$\Delta W32 = K2 \cdot (U2-V2) \cdot X3$$

where U1 is a signal output from said first adding element at the first timing, U2 is a signal output from said second adding element at the first timing, V1 is a signal output from said first adding element at the second timing, V2 is a signal output from said second adding element at the second timing, X1 is a signal input to said first and second information transmission paths, X2 is a signal input to said third information transmission path, and X3 is a signal input to said fourth and fifth information transmission paths.

5. An apparatus according to claim 2, wherein said neural network includes:
  a first information transmission path for multiplying the rotor flux command value and the calculated rotor flux value selectively input from said switching means by a weight W11 and outputting the products;
  a differentiating element for differentiating the rotor flux command value and the calculated rotor flux value selectively input from said switching means;
  a second information transmission path for multiplying the outputs from said differentiating element by a weight W21 and outputting the products;
  a third information transmission path for multiplying the torque current command value and the calculated torque current value selectively input from said switching means by a weight W32 and outputting the products; and
  an adding element for adding the outputs from said first and second information transmission paths and outputting the sum signal as the excitation current command value,
  said switching means supplies the rotor flux command value and the torque current command value to said neural network at the first timing, supplies the calculated rotor flux value and the calculated torque current value to said neural network at the second timing, and supplies the outputs from said adding element and said third information transmission path to said back-propagation means at the first and second timings, and
  said neural network means further includes a dividing element for dividing the output from said third information transmission path by the rotor flux command value and outputting the quotient as the slip frequency command value.

6. An apparatus according to claim 5, wherein said back-propagation means calculates correction amounts $\Delta W11$, $\Delta W21$, and $\Delta W32$ of the weights on the basis of the following equations:

$$J = (\tfrac{1}{2}) \cdot \{(U1-V1)^2 + (U2-V2)^2\}$$

where J is an evaluation function, U1 is a signal output from said adding element at the first timing, U2 is a signal output from said dividing element at the first timing, V1 is a signal output from said adding element at the second timing, V2 is a signal output from said dividing element at the second timing, X1 is a signal input to said first information transmission path and said differentiating element, X2 is a signal input to said second information transmission path, X3 is a signal input to said third information transmission path, and K1 to K3 are gains of said first to third information transmission paths, respectively.

7. A driving control apparatus for an induction motor, comprising:
  parameter detecting means for detecting control parameters of said induction motor;
  calculating means for calculating a rotor flux and a torque current of said induction motor on the basis of the control parameters;
  neural network means, having weights to provide an excitation current command value and a slip frequency command value, for receiving a rotor flux command value and a torque current command value for said induction motor, rotor flux and torque current values calculated by said calculating means, and a detected torque current value of said induction motor, and for processing the received rotor flux command value, the received torque current command value, the received rotor flux value, and the received torque current value and the detected torque current value in accordance with the weights, and outputting an excitation current command value and a slip frequency command value;
  back-propagation means for processing the excitation current command value and the slip frequency command value input from said neural network means, to obtain a plurality of correction amounts corresponding to the weights, and optimizing the weights in accordance with the correction amounts; and
  vector control means for detecting an actual excitation current and an actual torque current of said induction motor on the basis of the slip frequency command value output from said neural network means and the control parameters, and controlling said induction motor in accordance with a deviation between a detected actual excitation current value and the excitation current command value and a deviation between a detected actual torque current value and the torque current command value.

8. An apparatus according to claim 7, wherein said neural network means comprises a neural network, constituted by a plurality of information transmission paths having respective variable weights, for receiving the detected torque current value from said vector control means, switching means for selectively supplying the rotor flux command value, the torque current command value, the calculated rotor flux value, the calculated torque current value, and the detected torque current value to said information transmission paths and selectively supplying the outputs from said information transmission paths to said back-propagation means, and said back-propagation means correct the weights of said information transmission paths to optimal values in accordance with the outputs from said information transmission paths.

9. An apparatus according to claim 8, wherein said neural network means further comprises an adding element and a dividing element, said neural network comprises:
  a first information transmission path for multiplying the rotor flux command value and the calculated rotor flux value selectively input from said switching means by a weight W11 and outputting the products;

a differentiating element for differentiating the rotor flux command value and the calculated rotor flux value selectively input from said switching means;

a second information transmission path for multiplying the outputs from said differentiating element by a weight W22 and outputting the products; and a third information transmission path for multiplying the torque current command value, the calculated torque current value, and the detected torque current value selectively input from said switching means by a weight W32 and outputting the products, said switching means supplies the rotor flux command value and the detected torque current value to said neural network at the first timing, supplies the calculated rotor flux value and the calculated torque current value to said neural network at the second timing, supplies the rotor flux command value and the torque current command value to said neural network at the third timing, supplies the outputs from said first to third information transmission paths to said back-propagation means at the first and second timings, and supplies the output from said third information transmission path to said dividing element at the third timing, said adding element adds the outputs from said first and second information transmission paths and outputs the sum as the excitation current command value, and said dividing element divides the output from said third information transmission path by the rotor flux command value and outputs the quotient as the slip frequency command value.

10. An apparatus according to claim 9, wherein said back-propagation means calculates correction amounts $\Delta W11$, $\Delta W21$, and $\Delta W32$ of the weights on the basis of the following equations:

$$J = (\tfrac{1}{2}) \cdot \{(U1-V1)^2 + (U3-V3)^2\}$$

$$\Delta W11 = (U1-V1) \cdot X1 \cdot K1$$

$$\Delta W21 = (U2-V2) \cdot X2 \cdot K2$$

$$\Delta W32 = (U3-V3) \cdot X3 \cdot K3$$

where J is an evaluation function, U1, U2, and U3 are signals output from said first to third information transmission paths at the first timing, respectively, V1, V2, and V3 are signals output from said first to third information transmission paths at the second timing, respectively, X1 is a signal input to said first information transmission path and said differentiating element, X2 is a signal input to said second information transmission path, X3 is a signal input to said third information transmission path, and K1 to K3 are gains of said first to third information transmission paths, respectively.

11. An apparatus according to claim 8, wherein said neural network includes:

a first information transmission path for multiplying the rotor flux command value and the calculated rotor flux value selectively input from said switching means by a weight W11 and outputting the products;

a differentiating element for differentiating the rotor flux command value and the calculated rotor flux value selectively input from said switching means;

a second information transmission path for multiplying the outputs from said differentiating element by a weight W21 and outputting the products;

a third information transmission path for multiplying the torque current command value, the calculated torque current value, and the detected torque current value selectively input from said switching means by a weight 32 and outputting the products;

an adding element for adding the outputs from said first and second information transmission paths and outputting the sum as the excitation current command value; and a dividing element for dividing the output from said third information transmission path by the rotor flux command value and outputting the quotient as the slip frequency command value, and said switching means supplies the rotor flux command value and the detected torque current value to said neural network at the first timing, supplies the calculated rotor flux value and the calculated torque current value to said neural network at the second timing, supplies the rotor flux command value and the torque current command value to said neural network at the third timing, supplies the outputs from said adding element and said dividing element to said back-propagation means at the first and second timings, and outputs the output from said dividing element as the slip frequency command value at the third timing.

12. An apparatus according to claim 8, wherein said neural network comprises:

a first information transmission path for multiplying the rotor flux command value and the calculated rotor flux value selectively input from said switching means by a weight W11 and outputting the products;

a differentiating element for differentiating the rotor flux command value and the calculated rotor flux value selectively input from said switching means;

a second information transmission path for multiplying the outputs from said differentiating element by a weight W21 and outputting the products;

a third information transmission path for multiplying the torque current command value, the calculated torque current value, and the detected torque current value selectively input from said switching means by a weight W32 and outputting the products; and an adding element for adding the outputs from said first and second information transmission paths and outputting the sum as the excitation current command value, said neural network means includes a dividing element for dividing the output from said third information transmission path by the rotor flux command value and outputting the quotient as the slip frequency command value, and said switching means supplies the rotor flux command value and the detected torque current value to said neural network at the first timing, supplies the calculated rotor flux value and the calculated torque current value to said neural network at the second timing, supplies the rotor flux command value and the torque current command value to said neural network at the third timing, supplies the outputs from said adding element and said dividing element to said back-propagation means at the first and second timings, and outputs the output from said dividing element as the slip frequency command value at the third timing.

* * * * *